United States Patent [19]

Davis et al.

[11] 3,860,560

[45] Jan. 14, 1975

[54] BASIC DYEABLE POLYAMIDES

[75] Inventors: Gerald Wayne Davis, Charlotte, N.C.; Jimmy Bernard Sheats, Nashville, Tenn.

[73] Assignee: Fiber Industries, Inc., Charlotte, N.C.

[22] Filed: Jan. 7, 1972

[21] Appl. No.: 216,291

[52] U.S. Cl. ............... 260/49, 2/243 A, 8/178 R, 117/161 P, 260/78 A, 260/78 SC, 260/505 C, 260/507 R
[51] Int. Cl. ............... C08g 20/20, C08g 20/38
[58] Field of Search ................. 260/49, 78 SC, 78 A

[56] References Cited
UNITED STATES PATENTS

| | | | |
|---|---|---|---|
| 3,039,990 | 6/1962 | Huffman | 260/42 |
| 3,142,662 | 7/1964 | Huffman | 260/78 |
| 3,184,436 | 5/1965 | Magat | 260/78 |
| 3,238,180 | 3/1966 | Wiloth | 260/47 |
| 3,438,949 | 4/1969 | Crovatt | 260/78 |
| 3,542,743 | 11/1970 | Flamand | 260/78 |
| 3,663,508 | 5/1972 | Mobius et al. | 260/49 |
| 3,755,255 | 8/1973 | Lodge | 260/49 |

*Primary Examiner*—Lester L. Lee
*Attorney, Agent, or Firm*—Thomas J. Morgan; Robert J. Blanke

[57] ABSTRACT

A basic dye receptive polyamide polymer and fiber and fabric prepared therefrom said polymer containing minor percentages of at least one sulfoaryloxycarboxylic acid or salt thereof.

5 Claims, No Drawings

BASIC DYEABLE POLYAMIDES

The present invention relates to the preparation of polyamides which will accept basic dyes.

Polyamides are well-known for their fiber-forming ability. Fibers made therefrom i.e., nylon, are characterized by high strength, abrasion resistance, ease of formation, ease of transformation into fabrics, and the like. Since most textile uses require the ability of the fiber to be dyed, it has been necessary to find systems for such dyeing. Accordingly, the dyes normally used to dye nylon were disperse dyes initially developed for cellulose acetate and acid dyes normally used for wool which also contains a multiplicity of amide linkages. This has proven satisfactory for many end purposes but has not permitted use of the cationic or basic dyes which are often characterized by their brilliance of color. Because there are relatively few carboxyl end groups in the usual nylon molecules and because such sites are of limited strength, i.e., acidity, such end groups have not been utilized as a major source of basic dye-receptive sites.

Moreover, with fibers of different dye-receptive natures it is possible to effect multi-hued dyeing of mixed fabrics by immersion in a single dyebath containing different types of dyes or a dye which will be picked up by only one type of fiber, or by successive immersion in baths containing different classes of dyes of different color. The inability to dye nylon with basic dyes has limited the extent to which it has been possible to practice such methods.

Attempts have been made to incorporate in the nylon fiber, either physically or chemically, structures which would attract and combine with basic dye molecules, with varying degrees of success. Oftentimes dyeability is achieved but the dyeings are not lightfast or washfast. Other times the structure is secured to the polyamide molecule but the selectivity between the modified and unmodified polyamides is insufficient. Sometimes the amount of additive needed to impart the desired degree of basic dyeability is so great as to seriously impair the physical properties of the fiber, i.e., the tenacity, elongation, modulus, melting point, hydrophobicity, and the like. Most important, such modification is often extremely costly, or the limited effectiveness requires use of only costly basic dyes, thereby limiting its applicability.

It is accordingly an object of the present invention to provide a method for modifying conventional fiber-forming polyamides so that they will accept readily available basic dyes without significant adverse effect on the physical properties of the fiber, the dyeings being lightfast, washfast, and otherwise commercially acceptable.

These and other objects and advantages have now been realized in accordance with the present invention pursuant to which there is present in the polyamide molecule about 0.5 to 2.5 mole percent, and preferably about 0.75 to 2 mole percent, of at least one sulfoaryloxycarboxylic acid or salt thereof having the following general formula:

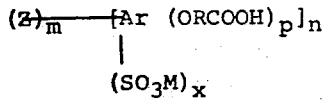

where Ar is a multivalent aromatic nucleous, $p = 1$ or 2, $n = 1$ or 2; $m = 0$ or 1; $x = 1$ or 2; Z is a member selected from the group consisting of O, alkylene, $SO_2-$; alkylene-dioxy; $-COOH$ and $-NH_2$ and M is hydrogen or a monovalent metal.

Most preferred are compounds wherein a single aromatic group is sulfonated as represented by the following general formula:

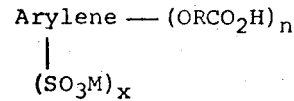

where R is an alkyl or aryl radical, M is hydrogen or a monovalent metal, $n = 1$ or 2 and $x = 1$ or 2. Specific compounds which have been found to be especially effective in giving polyamides a high affinity for basic dyes are:

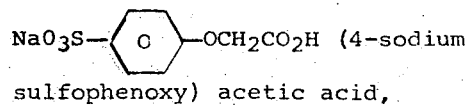

(4-sodium sulfophenoxy) acetic acid,

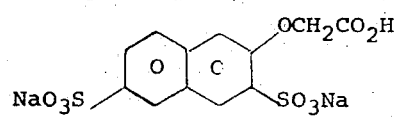

(3,6-disodium disulfo-2-naphthoxy) acetic acid, and

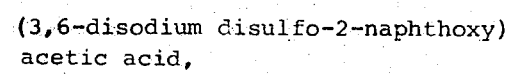

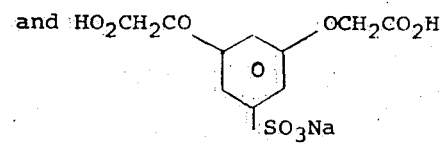

(sodium sulfophenylene) dioxyacetic acid While smaller amounts may be present, they will not impart the desired dyeability to any significant extent; larger amounts are undesired because the molecules are already capable of picking up enough dye for deep shades and, moreover, excessive sulfonic acid moieties will adversely affect the hydrophobicity of the fiber and its strength when wet.

The sulfoaryloxycarboxylic acid may be chemically linked to the polyamide molecule either at its ends or in the middle of a chain, depending upon whether it is mono- or di-functional. The chemical link can be effected by condensation and water removal with the polyamide in molten form although preferably it is effected by adding the sulfoaryloxycarboxylic acid or salt directly to the material from which the polyamide is to be produced by condensation, e.g., an aqueous solution of hexamethylenediammonium adipate.

Since a mono-carboxylic acid additive which enters the polymer serves to terminate the chain, an excessive amount will unduly limit the molecular weight of the polymer. The object of course, is to introduce a particular amount of sulfonic acid-cationic dye molecule receptive groups and if the level desired is beyond a particular amount, then other measures must be taken to avoid too drastic a reduction in molecular weight. Thus, it is desirable not to use the monocarboxylic acid additive in excess of about 2.0 mole percent and preferably not in excess of about 1.6 mole percent and if greater dyeability is still desired it can be achieved by using those mono-carboxylic acid additives which contain more sulfonic acid groups per molecule or by the use of sulfonated dicarboxylic acid additives which will not impair the molecular weight. Other measures may also be taken to increase the molecular weight such as vacuum removal of moisture from the melt in the course of continuous polymerization, using nitrogen or other inert gas to remove moisture from the chip or a melt thereof, by addition of chemical accelerators such as phenylphosphonic acid, as well as combinations of such techniques.

Although the sulfoaryloxy group may be attached to a variety of carboxylic acids, e.g., lower fatty acids such as propionic acid, butyric acid, and the like, or aromatic acids such as benzoic acid, from the standpoints of both cost and performance it is preferably attached to acetic acid. The sulfoaryloxycarboxylic acid, as noted, may be used as the free acid or with either the sulfonic acid or carboxylic acid in salt form, e.g., as the sodium, potassium, ammonium or amine salt. Preferably, the sulfonic acid groups are in salt form and the carboxylic acid groups are free since that is the easiest form in which to produce them and is quite satisfactory in polymerization.

The nylon polymers into which the additives may be incorporated include all of those commercially available whether based on dicarboxylic acid-diamines, aminocarboxylic acids or mixtures thereof. Thus, the monomer units making up the balance of the modified nylon molecule may include one or more of adipic acid, sebacic acid, terephthalic acid, isophthalic acid, aminobutyric acid, aminocaproic acid, aminoundecanoic acid, hexamethylenediamine, phenylenediamine, and the like. The polymerizations may be carried out batchwise or continuously, in known manner, starting from salt solutions or lower molecular weight amides using heat and vacuum.

Several of the additives employed herein are new compounds and some others, though described in the literature, have not been prepared commercially. Accordingly, syntheses of such additives will be described in the following examples in addition to their use in making nylon polymer, fiber and fabrics. Throughout such examples all parts and proportions are by weight unless otherwise expressed.

EXAMPLE I a. A 5-liter four-necked round bottomed flask was charged with 464.4 g (2moles) of p-phenolsulfonic acid sodium salt dihydrate and 5 liters of water. The flask was fitted with a stirrer, thermometer, condenser, and addition funnel. The addition funnel was charged with a solution of 80 g (2 moles) of sodium hydroxide in 250 ml of water. The caustic solution was added rapidly dropwise to the flask with moderate stirring, producing a pale yellow solution and a slight temperature rise of about 5°C. A solution of 189.0 g (2moles) of chloroacetic acid in 250 ml of water was neutralized with a solution of 80 g (2 moles) of sodium hydroxide in 250 ml of water. The resultant sodium chloroacetate solution was charged to the addition funnel and added dropwise to the flask containing the sodium p-phenolsulfonate. The final solution was light yellow in color. The solution was refluxed overnight and then cooled to 60°–70°C. The addition funnel was charged with 323 g of concentrated sulfuric acid (96percent, Sp. Gr. 1.84) which was then added dropwise to the flask over a three hour period. the acidic solution was allowed to cool with vigorous stirring. The precipitated 4-sodium sulfophenoxyacetic acid was filtered and dried throughly. The yield was about 55 percent.

b. 786 g of hexamethylene diammonium adipate salt was dissolved in an autoclave, 524 cc of distilled water and 1.8 mole percent of 4-sodium sulfophenoxyacetic acid was added together with hexamethylenediamine sufficient to neutralize the carboxlic acid. 1.17 g of $TiO_2$ was added and the autoclave was purged with nitrogen and heated with removal of $H_2O$ vapor, the pressure building up. The temperature was raised to 280°C over one hour, the pressure building up to 250 psig and then being permitted to fall off to atmospheric, after which heating was discontinued and the autoclave contents allowed to cool and solidify. The product had a content of 4-sodium sulfophenoxyacetic acid of 1.8 mole percent and an R.V. of about 30 measured as an 8 percent by weight solution in 90 percent formic acid.

c. The polymer produced in (b) was spun into a 16 dpf yarn which was then knit into sample hoselegs. The hoselegs were dyed with a variety of cationic dyes and tested, the results being set forth in the various tables hereinbelow.

EXAMPLE II a. A flask fitted with a mechanical stirrer, thermometer, reflux condenser and dropping funnel was charged with 110 g (1mole) of 1,4-dihydroxybenzene and 2,000 ml of water and 250 cc of an 8 M aqueous solution of sodium hydroxide, i.e., 80 g (2 moles) of sodium hydroxide. A second 250 cc of the sodium hydroxide solution was added to 154 grams (2 moles) of chloroacetic acid present as an 8 M solution in water. The resultant sodium chloroacetate solution (pH 5.5) was added to the solution of the sodium salt of the dihydroxybenzene over 1.5 hours and the batch refluxed for 20 hours. After cooling to 65°C, sulfuric acid was added to lower the pH to about 2 and the solution was cooled to room temperature. The resulting precipitate of 1,4-phenylenedioxydiacetic acid was filtered, washed with water and dried, giving an 80 percent yield.

b. By generally similar procedures there were produced the following aryloxyacetic acids from chloroaectic acid, the corresponding phenol or naphthol and sodium hydroxide:

| | |
|---|---|
| 1,3-phenylenedioxydiacetic acid | Yield 50% |
| 4,4'-isopropylidene-bis-(phenoxyacetic acid) | Yield 93% |

EXAMPLE III 696 grams of 3-hydroxy naphthylene 2,7-disulfonic acid sodium salt and 8 liters of water were charged into a 12-liter 4-necked round bottomed flask equipped with stirrer. condenser addition funnel and thermometer. When the sodium salt had dissolved, 80 grams of sodium hydroxide were added to the flask, followed by 0.75 grams of potassium iodide. 189 grams of chloroacetic acid were then dissolved in 500 milliters of water and then neutralized with a solution comprising 80 grams of sodium hydroxide in 500 milliters of water. This solution was then added over a one hour period, dropwise, through the addition funnel of the 12-liter flask. The mixture was then allowed to reflux for 24 hours. 323 grams of concentrated sulfuric acid were then added over a 3 hour period and the reaction allowed to cool with vigorous stirring. After cooling, the solution was concentrated to approximately one-half its original volume, and a precipitate obtained. The precipitate was collected, dissolved in water, treated with de-colorizing carbon and boiled vigorously. The de-colorizing carbon was then filtered off, the solution cooled, and the precipitate collected, the precipitate being 3,6-disulfonapth-2-oxyacetic acid, in a yield of about 50 percent.

EXAMPLE IV a. 22.6 g of 1,4-phenylenedioxydiacetic acid (Example 2a) were added to concentrated sulfuric acid containing 49 g of $H_2SO_4$ and 0.16 g of KI and stirred with heating until a solution was formed. The temperature was raised to 110°C and maintained for one hour, after which it was poured over 50 g of ice. A 12.5 M solution of sodium hydroxide was added in amount sufficient to neutralize only the sulfonic acid groups, whereupon there was obtained 29 g of a precipitate of 2-sulfo-1,4-phenylenedioxydiacetic acid.

b. In a duplicate run there were obtained 20 g of 2-sulfo-1,4-phenylenedioxyacetic acid. Upon addition of isopropanol to the solution, there were obtained an additional 4 g of 2,5-disulfo-1,4-phenylenedioxydiacetic acid.

EXAMPLE V a. By the process set out in Example 4 (b), except that the temperature was held at 100°C, from 1,3-phenylenedioxydiacetic acid there were obtained 12 g of 4-sulfo-1,3-phenylenedioxydiacetic acid and 3 g of 4,6-disulfo-1,3-phenylenedioxydiacetic acid.

b. By repeating the process of (a) with the addition of 0.16 g of KI, after only 30 minutes of reaction there were obtained 13 g of 4,6-disulfo-1,3-phenylenedioxydiacetic acid and no mono-sulfo product.

By the process of Example 1b there were produced nylon 66 copolymers containing molar amounts of sulfoaryl-containing carboxylic acids as indicated in the following Table 1;

Various of the polymers of Table 1 were extruded into yarns as in Example 1C, knit into hoselegs, dyed with various basic dyes and tested for lightfastness by exposure for 40 hours in a Fade-O-Meter to a xenon arc. The results are set forth in Tables 2 and 3 based on a 0–5 scale wherein 5 indicates no change in color compared to the fabric before exposure and 0 indicates severe discoloration.

TABLE 2

1.8 Mole % 4-Sulfophenoxyacetic Acid (Ex. 1b)

| Dyestuff | Rating |
|---|---|
| Sevron Blue RCN | 4 |
| Sevron Blue GCN | 3–4 |
| Sevron Blue 2G | 4 |
| Sevron Blue B | 3–4 |
| Eastacryl Blue 2R | 4 |
| Sevron Yellow MFW | 4 |
| Eastacryl Yellow 3G | 4–5 |
| Astrazon Yellow 7GLL | 4–5 |
| Astrazon Golden Yellow GL | 4 |
| Synacril Yellow-Brown G | 4 |
| Sevron Red GL | 4 |
| Synacril Fast Red 2G | 4 |
| Sevron Red L | 4 |
| Undyed | 4–5 |

TABLE 3

| Polymer of Example | Rating | |
|---|---|---|
| | Sevron Red L | Sevron Blue B |
| 5 | 3–4 | 3 |
| 7 | 4 | 3 |
| 8 | 3 | 1–2 |
| 10 | 2 | 1–2 |
| 11 | 3 | 2–3 |
| 12 | 3–4 | 3–4 |
| 13 | 2 | 1 |
| 14 | 2–3 | 1 |
| 15 | 3–4 | 2–3 |
| 16 | 4 | 3 |
| 17 | 4–5 | 4–5 |
| 18 | 4–5 | 3–4 |
| 19 | 3–4 | 3 |
| 20 | 2 | 1–2 |
| 21 | 4–5 | 1–2 |
| 22 | 4 | — |

TABLE I

| Ex. | ARYLOXYACETIC ACID (A) | COADDITIVE (B) | MOLE %(A/B) |
|---|---|---|---|
| 5 | 4-sulfophenoxyacetic | None | 2 |
| 1b | do. | do. | 1.8 |
| 6 | do. | do. | 1.5 |
| 7 | do. | 5-sulfoisophthalic | 1/0.6 |
| 8 | do. | do. | 1/0.5 |
| 9 | do. | do. | 0.8/0.7 |
| 10 | 3,6-disulfo-naphth-2-oxyacetic | None | 1 |
| 11 | do. | do. | 1(a) |
| 12 | do. | do. | 1(b) |
| 13 | do. | 5-sulfoisophthalic | 0.75/0.5 |
| 14 | do. | do. | 0.75/0.5(d) |
| 15 | do. | do. | 0.4/0.7 |
| 16 | do. | do. | 0.4/0.7(c) |
| 17 | do. | do. | 0.4/0.7(a) |
| 18 | 4-sulfo-1,3-phenylene-dioxydiacetic | | 1.6 |
| 19 | 2-sulfo-1,4-phenylenedioxydiacetic | | 1.6 |
| 20 | 4,6-disulfo-1,3-phenylenedioxydiacetic | | 1.6 |
| | a) 0.1% Irganox 1093/0.05% sodium hypophosphite | | |
| | b) 0.2% Irganox 1093/0.10% sodium hypophosphite | | |
| | c) 0.1% Irganox 1010/0.0.05% sodium hypophosphite | | |
| | d) 3 wt. % caprolactam in polymer | | |
| 21 | 4-sulfophenoxyacetic | 9,9-bis-(β-carboxyethyl) fluorene-2-sulfonic acid monosodium salt | 0.75/0.75 |
| 22 | 4-sulfophenoxyacetic | 4-sulfo-1,3-phenylenedioxy-diacetic | 1.0/0.5 |

When the novel yarns are woven into fabrics with unmodified nylon yarns and dyed in basic dyebaths the novel yarns are dyed while the unmodified yarns pick up only little or no color. When dyed in baths containing acid dyes, the novel yarns are substantially unstained, i.e., reserved, while the conventional yarns are dyed.

It will be appreciated that the instant specification and examples are set forth by way of illustration and not limitation, and that various modifications and changes may be made without departing from the spirit and scope of the present invention.

Having thus disclosed the invention, what is claimed is:

1. A fiber-forming polyamide which comprises the polymerization product obtained from dicarboxylic acid-diamines, aminocarboxylic acids or mixtures thereof reacted in the presence of from about 0.5 to 2.5 mole per cent based on the weight of the polymerization product of a sulfoaryloxycarboxylic acid or salt thereof having the formula:

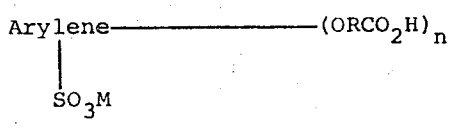

wherein R is an alkyl or aryl radical, M is hydrogen of a monovalent metal, and $n = 1$ or 2.

2. The fiber-forming polyamide of claim 1 wherein $n = 1$.

3. The produce of claim 1 wherein said polymerization product reacted in the presence of form about 0.5 to 2.5 mole per cent based on the weight of the polymerization product of a sulfoaryloxycarboxylic acid salt selected from the group consisting of

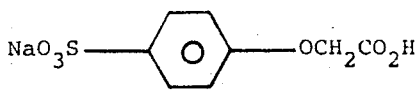

and

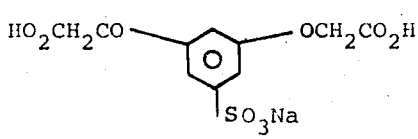

4. A polyamide according to claim 1 wherein said sulfoaryloxycarboxylic acid comprises about 0.75 to 2 mole per cent of the polymer molecule.

5. A polyamide according to claim 1 wherein there is present at least two sulfoaryloxycarboxylic acids, one being a monocarboxylic acid and another a dicarboxylic acid.

* * * * *